United States Patent [19]
Hutton et al.

[11] 3,992,952
[45] Nov. 23, 1976

[54] CONTROL SYSTEM FOR ANGULAR DISPLACEMENT SENSOR

[75] Inventors: Maurice F. Hutton, Pompton Lakes; Bernard Friedland, West Orange, both of N.J.

[73] Assignee: The Singer Company, Little Falls, N.J.

[22] Filed: Dec. 20, 1974

[21] Appl. No.: 534,615

[52] U.S. Cl. .................................................. 73/505
[51] Int. Cl.² ....................................... G01C 19/56
[58] Field of Search .......... 73/505, 517 AV, DIG. 1

[56] References Cited
UNITED STATES PATENTS

| | | | |
|---|---|---|---|
| 2,542,018 | 2/1951 | Ferrill, Jr. | 73/505 |
| 3,106,847 | 10/1963 | Mullins, Jr. et al. | 73/505 |
| 3,349,627 | 10/1967 | Hauf et al. | 73/505 |
| 3,354,724 | 11/1967 | Kabaian et al. | 73/505 |
| 3,538,774 | 11/1970 | Quick | 73/505 |
| 3,680,392 | 8/1972 | Hoffman et al. | 73/516 |

*Primary Examiner*—Herbert Goldstein
*Attorney, Agent, or Firm*—T. W. Kennedy

[57] ABSTRACT

Stable reference gyroscopic apparatus is provided in the form of an angular displacement sensor which employs an end-supported vibratory rod or wire, instead of the commonly used rotatable element. The apparatus of the invention incorporates an improved means for maintaining the vibrational amplitude of the center of the vibratory element constant, and electronic circuit means for causing the orbit of center of the vibratory element to remain in a straight line, both means being effective to eliminate the major sources of potential drift in the sensor.

6 Claims, 3 Drawing Figures

CONTROL SYSTEM FOR ANGULAR DISPLACEMENT SENSOR

BACKGROUND OF THE INVENTION

Rate and attitude indicating gyroscopic apparatus is described, for example, in U.S. Pat. No. 2,309,853, which apparatus is intended to provide navigational information, such as the heading of an aircraft with respect to the meridiam or other reference, the rate of turn of the aircraft, and the angular attitude of the aircraft about its longitudinal and transverse axes with respect to a particular reference position. The apparatus described in the patent employs a vibratory rod or wire which is secured at one or both ends for providing rate and attitude indications. Suitable electrical pick-offs are provided adjacent the vibratory element which serve to produce electric signals which are introduced to appropriate indicators. The drive of the vibratory element is generally controlled by one of two means, namely, by a "parametric drive" or by a "velocity feedback drive".

In a typical parametric drive, the bending motion of the vibratory element is sensed, and a resulting axial force is applied to the element. The resulting increase in tension tends to straighten the element and in the process increases its linear momentum. This makes up for the momentum lost in normal dissipative reactions and thereby maintains the system in vibration. For the parametric drive system to be operative, the force must be applied when the velocity of the vibratory element is towards the center, and since that condition occurs twice for each vibratory cycle, the force must be applied at twice the frequency of vibration. This type of drive permits the vibratory element to vibrate in any direction, which is a desirable characteristic in the vibratory type of gyroscope. However, the parametric drive is relatively inefficient, and substantial forces must be applied to the vibratory element to maintain it in its oscillating condition.

A more efficient drive means for the vibratory element is to provide movement-sensing and force-applying means in the form of capacitor electrodes which are mounted so that linear movements of the center of an end-supported elongated vibratory element may be sensed in each of two orthogonal directions. The signals generated by the sensing electrodes are amplified, processed and compared with reference signals, and the resulting differential signals are further processed to obtain electrical signals that are applied to the force-applying capacitor electrodes in order that the orthogonal movements of the center of the vibratory element may be maintained constant. Since the force is applied directly to the element in the velocity feedback drive type of system, the drive realized by this type of system is considerably more efficient than the drive provided in the parametric drive system.

In the type of end-supported elongated vibratory element system under consideration, a principal object is to maintain the plane of vibration of the elongated vibratory element fixed in inertial space so that angular displacement of the element with respect to inertial space may be measured. In general, however, due to minute imperfections in the physical structure of the element, the natural frequency of the element is not constant for all directions of vibration. Therefore, unless compensation is made, errors will arise in this type of system.

The resultant vibration of the center of the end-supported vibratory element may be regarded as the sum of two vibrations in the direction of the two principal axes. If the vibration frequencies along these two axes are not identical, a phase shift will develop which forces the orbit of the center of the vibratory element to become elliptical. The axis of the resulting ellipse may oscillate back and forth through substantial angles up to 90°, thus impairing the accuracy of the instrument. This can lead to excessive drift rates, and this drawback is the principal reason why the prior art instruments of this type have not become generally accepted as precision navigational instruments.

The apparatus of the present invention, however, is constructed so that as the orbit of the center of the end-supported elongated vibratory element tends to become elliptical, the elliptical configuration of the orbit, and the drift rates resulting therefrom, are automatically suppressed. This is in contradistinction to the usual prior art parametric and velocity feedback drive systems which normally act to maintain the elliptical motion. However, all the advantages of the prior art parametric drive and velocity feedback drive systems are retained, in that the vibratory element is free to vibrate in any direction, the drive of the vibratory element is achieved with a high degree of efficiency, and the vibration amplitude of the vibratory element is maintained constant.

DETAILED DESCRIPTION OF THE ILLUSTRATED EMBODIMENT

Figure 1:
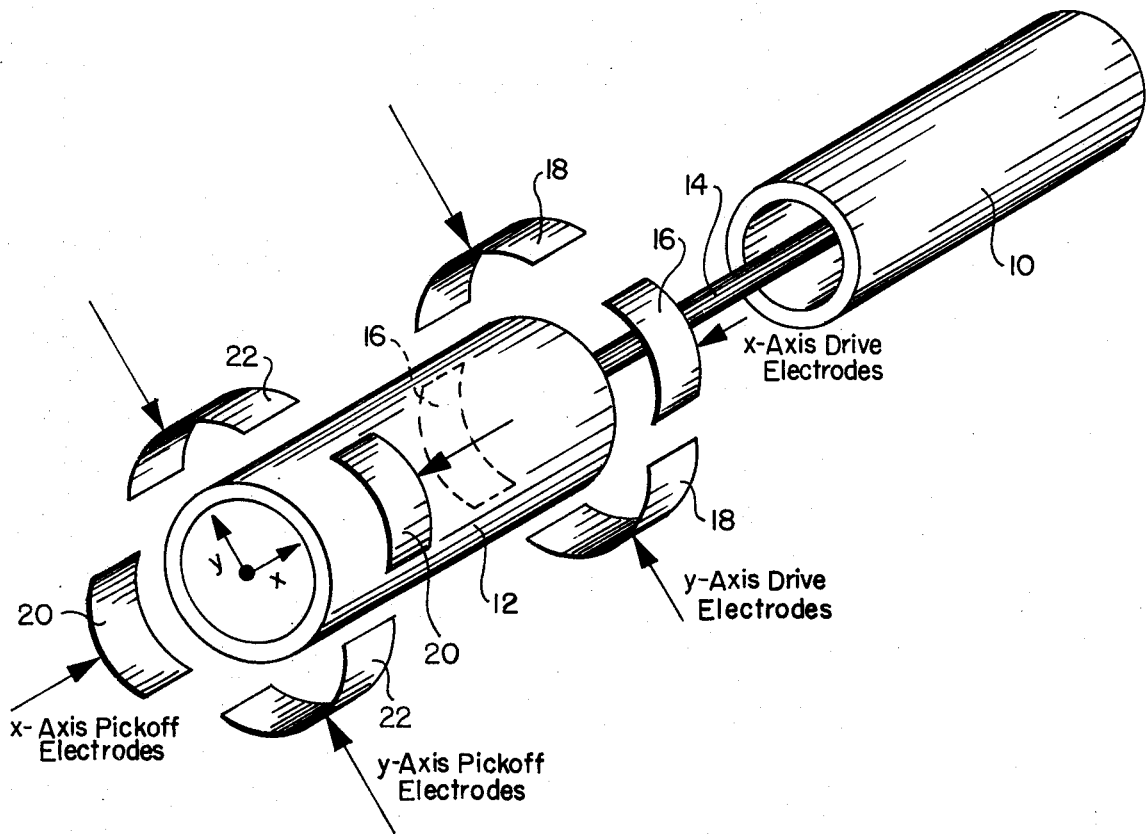
FIG. 1 is a schematic perspective representation of an end-supported elongated vibratory element type of gyroscopic instrument suitable for use in the apparatus of the invention.

The instrument illustrated in the diagram of FIG. 1 includes a first end piece 10 and a second end piece 12, and an elongated vibratory element 14 extending between the end pieces. The vibratory element 14 has its ends ridgedly attached to the end pieces which, in turn, are mounted in an appropriate casing through flexible supports.

A first pair of capacitor drive electrodes 16 are mounted diametrically opposite to one another astride the end piece to produce an electrostatic force on vibrating element, so as to drive the center of the element linearly and reciprocally along a first axis which may, for example, be designated the x-Axis. A second pair of capacitor drive electrodes 18 are positioned diametrically opposite to one another, and on astride the end piece 12. The drive electrodes 18 create an electrostatic force on the vibrating element 14 which is perpendicular to the electrostatic force produced by the electrodes 16, and which is used to produce linear movements of the center of the vibratory element 14 reciprocally along an axis perpendicular to the x-Axis, and which may be termed the y-Axis.

The instrument of FIG. 1 also includes a first pair of pickoff capacitor electrodes 20 which are positioned diametrically opposite to one another on opposite sides of the vibratory element 14, and which are displaced longitudinally along the axis of the vibratory element 14 from the drive electrodes to sense linear movements of the center of the vibratory element along the x-Axis. Likewise, a further pair of capacitor pickoff electrodes 22 are positioned diametrically opposite one another, and on opposite sides of the vibratory element 14, adjacent to the pickoff electrodes 20, to sense linear movements of the center of the vibratory element along the y-Axis.

Figure 2:
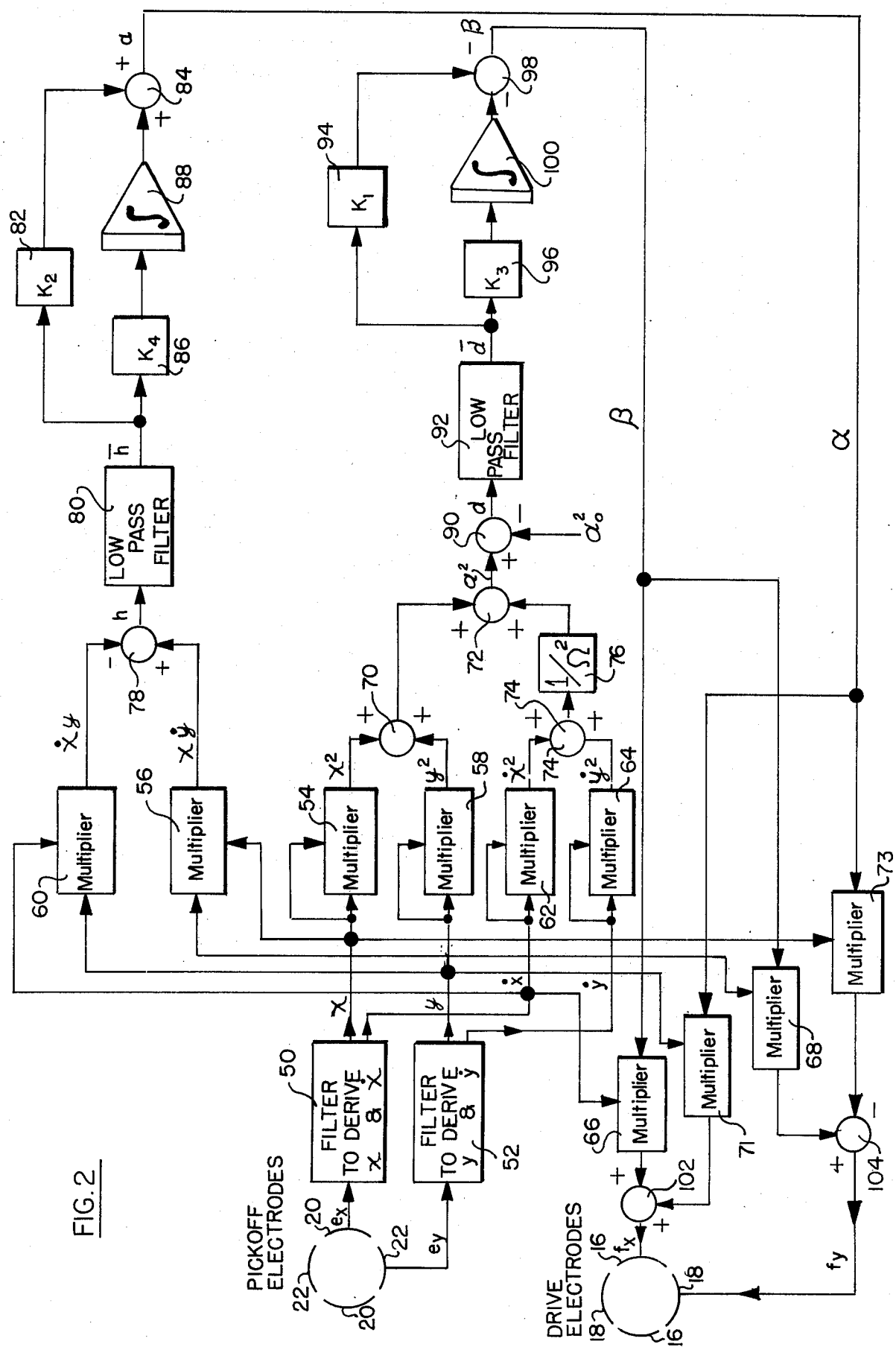
FIG. 2 is a block diagram of electronic circuitry for providing the drive signals for the vibratory element in the instrument of FIG. 1, and for maintaining the vibratory path of the vibratory element in a linear configuration.

As shown in FIG. 2, the x-Axis pickoff electrodes 20 produce an x-Axis pickoff signal $e_x$ which is introduced to a filter 50. The Y-axis pickoff electrodes 22, on the other hand, produce a y-Axis pickoff signal $e_y$ which is introduced to a filter 52. The filter 50 is constructed in known manner, to respond to the pickoff signal $e_x$ to derive two output signals, x and $\dot{x}$, respectively corresponding to the displacements of the center of the vibratory element along the x-Axis from instant-to-instant, and to the instantaneous velocity of the vibratory element along the x-Axis. Likewise, the filter 52 is constructed in known manner to respond to the pickoff signal $e_y$ to produce two output signals y and $\dot{y}$, respectively corresponding to the instantaneous displacement of the center of the vibratory element along the y-Axis.

The x and y output signals from the filters 50 and 52 are applied respectively to a pair of multipliers 54, 56 and to a pair of multipliers 58, 60. The output signals $\dot{x}$ and $\dot{y}$, on the other hand, are applied to a pair of multipliers 62 and 64 respectively. The $\dot{x}$ output signal is also applied to the multiplier 60 and to a further multiplier 66. The $\dot{y}$ output signal is also applied to the multiplier 56 and to a further multiplier 68. The y output signal is also applied to a multiplier 71, and the x output signal is also applied to a multiplier 73.

The multipliers 54, 56, 58, 60, 62, 64, 66, 68, 71, 73 may be constructed in known manner, and they, and the filters 50 and 52, constitute commercially available components. The multiplier 54 multiplies the output signal x with itself to produce an output signal $x^2$. The multiplier 58 multiplies the output signal y with itself to produce an output $y^2$.

The outputs $x^2$ and $y^2$ are applied to a summing network 70, the output of which is applied to a further summing network 72. The multiplier 62 multiplies the $\dot{x}$ signal with itself to produce an output $\dot{x}^2$, and the multiplier 64 multiplies the $\dot{y}$ signal with itself to produce an output signal $\dot{y}^2$. The signals $\dot{x}^2$ and $\dot{y}^2$ are applied to a summing network 74, the output of which is passed through a constant gain circuit 76 to the summing network 72.

The multiplier 60 multiplies the signal $\dot{x}$ with the signal y to produce an output signal $\dot{x}y$ which is applied to a substracting network 78. The multiplier 56 multiplies the signal x with the signal $\dot{y}$ to produce an output $x\dot{y}$ which also is applied to the subtracting network 78. The output h of the substracting network 78 is passed through a low pass filter 80 to produce an output $\bar{h}$. The latter output is passed through a constant gain network 82 to a summing network 84, and through a constant gain network 86 and an integrator 88 to the summing network 84. The summing network 84 produces an output signal $\alpha$ which is applied to the multipliers 71 and 73.

The output $a^2$ from the summing network 72 is applied to a subtracting network 90 in which it is compared with a reference signal $a_0^2$, and the resulting output d is passed through a low pass filter 92 to produce a signal $\bar{d}$. The signal $\bar{d}$ is applied to a constant gain network 94 and to a constant gain network 96. The network 94 is connected to a summing network 98, and the network 96 is connected through an integrator 100 to the summing network 98. The summing network 98 produces an output $\beta$ which is applied to the multipliers 66 and 68.

The constant gain networks, the integrator networks, the summing and subtracting networks, and the low pass filters are all in themselves well known to the art and commercially available, so that a detailed circuit description of these elements is deemed to be unnecessary. For the purposes of the following mathematical analysis, the constant gain network has been designated $1\Omega^2$ where $\Omega$ is the nominal frequency of vibration of the vibratory element, and the constant gain network 94, 82, 96 and 86 have been designated K1, K2, K3 and K4.

The outputs of the multipliers 66 and 71 are applied to a summing network 102 which produces an output $f_x$ which is applied to the drive electrode 16. The multipliers 68 and 73 apply their outputs to a subtracting network 10 which produces an output $f_y$ which is applied to the y-Axis drive electrode 18.

A complete understanding of the control effectuated by the electronic control system of FIG. 2 may be realized from the following mathematical discussion.

The signals from the x and y pickoff electrodes 20, 22 are fed back to the x and y drive electrodes 16, 18 through an electrical/electronic control system having components that perform the operations shown in FIG. 2. The mathematical equations describing these operations are as follows:

The pickoff signals (which may be either voltages or currents) for each axis are processed by appropriate filters 50, 52 to provide estimates of the respective position and velocity:

$$x = H_1(s)e_x \quad y = H_1(s)e_y$$
$$\dot{x} = H_2(s)e_x \quad \dot{y} = H_2(s)e_y \qquad (1)$$

where $e_x$ and $e_y$ are the x-Axis and y-Axis pickoff signals, respectively, $H_1(s)$ and $H_2(s)$ are filter transfer functions, x and y are the estimates of instantaneous linear displacements in the orthogonal directions defined by the electrodes; $\dot{x}$ and $\dot{y}$ are the respective time derivatives.

The forces generated by the drive electrodes are related to the x, y, $\dot{x}$, $\dot{y}$ signals by the relations $$f_x = \alpha \cdot y + \beta \cdot \dot{x}$$
$$f_y = -\alpha \cdot x + \beta \cdot \dot{y} \qquad (2)$$

The variable gain $\alpha$ is obtained from an estimate of the angular momentum:

$$h = x\dot{y} - \dot{x}y \qquad (3)$$

which is passed to low-pass filter 80 to obtain $$\bar{h} = G(s)h$$

where $G(s)$ is the transfer function of the low pass filter. The characteristics of the low pass filter are not important to the overall system operation.

The variable gain $\alpha$ is proportional to $\bar{h}$ and its time integral $$= K_2\bar{h} + K_4 \int \bar{h}dt \qquad (4)$$

The gains $K_2$ and $K_4$ are selected to give a satisfactory transient response.

The variable gain $\beta$ is obtained by comparing an estimate of $a^2$, the square of the amplitude of oscillation, with a reference signal, $a_0^2$. The difference, $d$ given by $$d = a^2 - a_0^2 \qquad (5)$$

where
$$a^2 = x^2 + y^2 + 1/\Omega 2) (\dot{x}^2 + \dot{y}^2)$$

$\Omega$ = nominal frequency of vibration is passed through low pass filter 92, the characteristics of which are not important. The variable gain $\beta$ is proportional to this filtered difference $\bar{d}$ and its integral $$\beta = K_1 \bar{d} + K_3 \int \bar{d}\, dt \qquad (6)$$

The gains $K_1$ and $K_3$ are chosen to achieve satisfactory transient response.

Let x and y be the coordinates of the vibrating element relative to coordinates fixed in the case in which the electrodes are mounted. The motion of center of the element is governed by the differential equations $$\ddot{x} + d\dot{x} + \Omega_x^2 x = c\, w\dot{y} + f_x$$

$$\ddot{y} + d\dot{y} + \Omega_y^2 y = -c\, w\dot{x} + f_y \qquad (7)$$

where $\Omega_x$ and $\Omega_y$ are the natural frequencies of the vibration along the x and y axes
 $d$ is the damping factor
 $\omega$ is the angular velocity of the case ("input rate")
 $c$ is a constant $\approx 2$
 $f_x$, $f_y$ are the accelerations produced by the control system.

Figure 3:
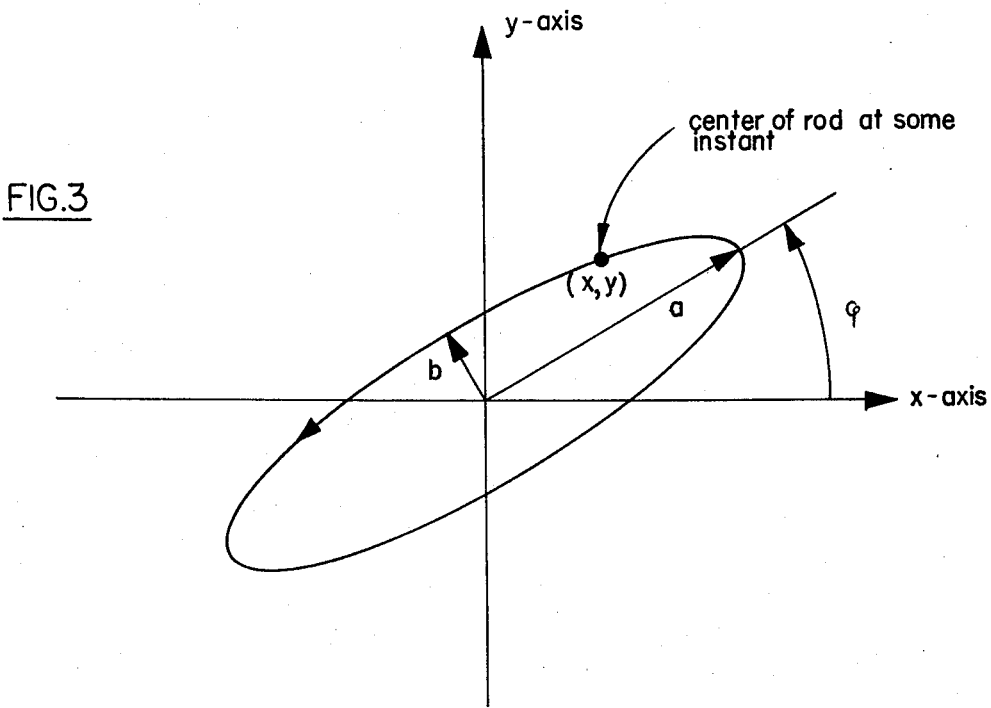
FIG. 3 is a graphic representation of the normal uncompensated orbit of the center of the rod.

The motion of the center traces out a nearly elliptical orbit, having an inclination $\phi$, semi-major axis a and semi-minor axis b, as shown in FIG. 3. These quantities obey the differential equations $$\dot{a} = -\frac{\Delta^2 b}{2\Omega} \sin 2\phi - \frac{d}{2} a + f_a$$

$$\dot{b} = -\frac{\Delta^2 a}{2\Omega} \sin 2\phi - \frac{d}{2} b + f_b \qquad (8)$$

$$\dot{\phi} = \frac{\Delta^2 ab}{\Omega(a^2 - b^2)} \cos 2\phi - \frac{c}{2}\omega + f$$

where
$$\Delta^2 = (\Omega_x^2 + \Omega_y^2)/2$$

$$\Omega^2 = (\Omega_x^2 + \Omega_y^2)/2 \qquad (9)$$

$$f_a = -\frac{\sin\Omega t}{\Omega}(f_x \cos\phi + f_y \sin\phi)$$

$$f_b = \frac{\cos\Omega t}{\Omega}(-f_x \sin\phi + f_y \cos\phi) \qquad (10)$$

$$f_\phi = \frac{1}{\Omega^2(a^2 - b^2)}[(b\cos\phi)f_x - (a\sin\phi)f_y]$$

The ideal sensor is one in which the rate of rotation of the major axis of the ellipse is proportional to the input rate $\omega$, and is attained for $f_\phi = 0$ when $\Delta$, $a$, or $b$ is zero. Since $\Delta$ is a physical parameter of the device, it cannot be made zero. Moreover, it is required to keep $a$ = constant to obtain a useful signal output. Thus the ideal relationship can be maintained only with a control system that is designed to maintain $a = a_0$ (reference quantity)

$b = 0$

This must be achieved without the introduction of any $f_\phi$ term which would cause a rotation of the major axis of the ellipse. A control law of the form (2) has $f = 0$ and thus meets this requirement.

A control law of the form (2) also gives $$f_a = -\frac{1}{2\Omega} \alpha b + \frac{1}{2}\beta a$$

$$f_b = -\frac{1}{2\Omega} \alpha a + \frac{1}{2}\beta b$$

Thus, the closed loop equations for a, b and $\Delta$ are $$\dot{a} = -\frac{\Delta^2 b}{2\Omega} \sin 2\phi - \frac{d}{2} a - \frac{1}{2\Omega}\alpha b + \frac{1}{2}\beta a$$

$$\dot{b} = -\frac{\Delta^2 a}{2\Omega} \sin 2\phi - \frac{d}{2} b - \frac{1}{2\Omega}\alpha a + \frac{1}{2}\beta b$$

$$\dot{\phi} = \frac{\Delta^2 ab}{\Omega(a^2 - b^2)} \cos 2\phi - \frac{c}{\omega}$$

Using $\alpha$ and $\beta$ defined by (4) and (6) respectively, with $K_1$, $K_2$, $K_3$ and $K_4$ chosen to achieve stable dynamic performance, permits a to be driven to $a_0$ while b is driven to zero. A detailed stability analysis can be employed to obtain suitable values of $K_1$, $K_2$, $K_3$ and $K_4$. Since the ellipticity is driven to zero (i.e., $b = 0$) the desired closed loop performance $\dot{\phi} = (c/2)\omega$ is achieved by this closed loop design.

It will be appreciated, therefore, that the present invention provides an improved vibratory end-supported rod-type of gyroscope which serves as an angular displacement sensor, and which exhibits all the advantages of the prior art instruments of this general type, but none of the disadvantages, and which is capable of constituting a high precision navigational instrument.

Although a particular embodiment of the apparatus of the invention has been shown and described, modifications may be made. It is intended in the claims to cover the modifications which come within the spirit and scope of the invention.

What is claimed is:

1. Gyroscopic apparatus including:
 a casing;
 first and second support means mounted in said casing;
 an elongated vibratory element having its ends supported in said first and second support means and extending between said support means in said casing;
 first drive means mounted adjacent said vibratory element at a point intermediate the ends thereof and responsive to electric drive signals for creating drive forces for the center of said vibratory element along a first axis traversing the longitudinal axis of the vibratory element;
 second drive means mounted adjacent said vibratory element at the intermediate point thereon and responsive to electric drive signals for producing drive forces for the center of said vibratory element along a second axis traversing the longitudinal axis of the vibratory element;

first pickoff means mounted adjacent said vibratory element for sensing linear motion of the center of said vibratory element along said first axis and for producing pickoff signals corresponding thereto;

second pickoff means mounted adjacent said vibratory element for sensing linear motion of the center thereof along said second axis and for producing pickoff signals corresponding thereto; and electronic control circuitry connected to said pickoff means and responsive to the pickoff signals produced thereby to develop signals representative of the position and velocity of the center of the vibratory element along the first and second axis at any instant said control circuitry responding to said position and velocity signals to produce drive signals for said drive means so as to permit maintaining an amplitude of vibration of the center of said element essentially constant in any given direction and to force the ellipticity of the vibrational path of the center of said element essentially to zero, said electronic control circuitry comprising:

a. first means to develop a first signal which is the square of the velocity along said first axis;

b. second means to develop a second signal which is the square of the velocity along said second axis;

c. third means for developing a third signal which is the square of the position along said first axis;

d. fourth means for developing a signal which is the square of the position along said second axis;

e. fifth means for multiplying the signal representing the velocity along said first axis by the signal representing the position along said second axis to develop a fifth signal;

f. sixth means for multiplying the signal representing velocity along said second axis by the signal representing position along said first axis to develop a sixth signal;

g. seventh means for subtracting said fifth signal from said sixth signal to develop a seventh signal;

h. eighth means for adding said first and second signals to develop an eighth signal;

i. ninth means for adding said third and fourth signals to develop a ninth signal;

j. tenth means for multiplying said eighth signal by a constant gain to develop a tenth signal;

k. eleventh means for adding said tenth and ninth signals to develop an eleventh signal;

l. means for providing a reference signal;

m. twelfth means for subtracting said reference signal from said eleventh signal to develop a twelfth signal;

n. thirteenth means for filtering said twelfth signal to develop a thirteenth signal;

o. fourteenth means having said thirteenth signal as an input for developing a fourteenth signal which is the negative sum of said thirteenth signal times a first constant and the integral of said thirteenth signal times a second constant;

p. fifteenth means for multiplying said fourteenth signal by said signal representing velocity along said first axis to develop a fifteenth signal;

q. sixteenth means for multiplying said fourteenth signal by said signal representing velocity along said second axis to develop a sixteenth signal;

r. seventeenth means for filtering said seventh signal to develop a seventeenth signal;

s. eighteenth means having said seventeenth signal as an input for developing an eighteenth signal which is the sum of said seventeenth signal times a constant and the integral of said seventeenth signal times a constant;

t. Nineteenth means for multiplying said eighteenth signal by said signal representing position along said second axis to develop a nineteenth signal;

u. twentieth means for multiplying said eighteenth signal by the signal representing position along said first axis;

v. twenty-first means for adding said fifteenth and nineteenth signals to produce a drive signal for said first axis; and w. twenty-second means for subtracting said twentieth signal from said sixteenth signal to produce a drive signal for said second axis.

2. The gyroscopic apparatus defined in claim 1, in which said first and second drive means respectively comprise first and second pairs of capacitor drive electrodes diametrically mounted in said casing on opposite sides of said vibratory element.

3. The gyroscopic apparatus defined in claim 2, in which said pickoff means respectively comprise first and second pairs of capacitor pickoff electrodes diametrically mounted in said casing on opposite sides of said vibratory element.

4. The gyroscopic apparatus defined in claim 3, in which the first and second axes are disposed perpendicular to one another so that said drive electrodes create electrostatic forces for the center of the vibratory element in two orthogonal directions, and so that said pickoff electrodes sense linear motions of the center of the vibratory element in said two orthogonal directions.

5. The gyroscopic apparatus defined in claim 1, in which the pickoff means are displaced from the drive means along the longitudinal axis of said vibratory element, and in which said first and second axes are disposed perpendicular to the longitudinal axis and to one another.

6. Apparatus according to claim 1 wherein each of said fourteenth and eighteenth means comprise:

a. a first constant gain circuit;

b. a second constant gain circuit having its input tied to that of the first circuit;

c. an integrator having as its input the output of said first constant gain circuit; and d. summing means having as inputs the outputs of said integrator and said second constant gain circuit.

* * * * *